US006255370B1

United States Patent
Vizcaino et al.

(10) Patent No.: US 6,255,370 B1
(45) Date of Patent: Jul. 3, 2001

(54) RAIL SPIKE RETENTION AND TIE PRESERVATION MIXTURE AND METHOD

(75) Inventors: Walter F. Vizcaino, Littleton; Michael L. Raab, Denver, both of CO (US)

(73) Assignee: Railroad-Solutions, LLC, Denver, CO (US)

( * ) Notice: Subject to any disclaimer, the term of this patent is extended or adjusted under 35 U.S.C. 154(b) by 0 days.

(21) Appl. No.: 09/301,824

(22) Filed: Apr. 29, 1999

(51) Int. Cl.$^7$ ....................................................... C08K 3/00
(52) U.S. Cl. ............................... 524/62; 524/66; 524/492; 524/493
(58) Field of Search ................................ 524/62, 66, 492, 524/493

(56) References Cited

U.S. PATENT DOCUMENTS 2,777,641  1/1957  Snyder .
5,397,202  3/1995  Shrader et al. .

OTHER PUBLICATIONS

Product Information Data Sheet, Racine Railroad Products Co., Tie–Saver, From On–Line MSDS, UP–02399, Jun. 10, 1997.
Official Gazette of The U.S. Patent Office, Nov. 17, 1987, p. 1179, U.S. Patent No. 4,706,806, Destructible Cartridge for Anchoring Rods or the Like, Mauthe, Peter.
Official Gazette of the U.S. Patent Office, Mar. 13, 1990, p. 912, U.S. Patent No. 4,907,917, Method of Securing Anchor Rods, Leibhard, Erich.

*Primary Examiner*—Edward J. Cain
(74) *Attorney, Agent, or Firm*—Harold A. Burdick

(57) ABSTRACT

A rail spike retention and tie preserving mixture and method are disclosed for use in a wood cross tie at the situs of a driven rail spike, the mixture providing a single stage dry mixture application and including ground petroleum pitch, sub-angular silica sand and a hydrocarbon resin adhesive/sealant material. The mixture and method assure better spike retention in the tie while protecting the wood tie from degradation at and around the site of spike placement thus increasing the useful life of the tie.

18 Claims, 1 Drawing Sheet

RAIL SPIKE RETENTION AND TIE PRESERVATION MIXTURE AND METHOD

FIELD OF THE INVENTION

This invention relates to methods and materials for improving retention of anchors in wood structures, and, more particularly, relates to such methods and materials for use at the situs of a driven railroad spike into a wood cross tie.

BACKGROUND OF THE INVENTION

The rail industry has historically been plagued by the loosening and loss of rail spikes from wood cross ties, and has periodically undertaken a variety of efforts in response to this documented need for improvement of the spike/tie interface. Spike loss is caused by the lateral and vertical movement of a rail under load (relative to the cross tie, hereinafter referred to jointly as "lateral forces"), which movement creates a ratcheting effect on the rail spike and the tie. This ratcheting eventually results in loosening and, ultimately, dislodgement and loss of the spike and thus further loss of stability of the rail at the tie. Frequent replacement efforts are undertaken to replace lost spikes, the industry standard method involving the steps of driving a wooden plug into the aperture in the tie created by the previously driven and now lost spike, followed be driving of a new spike into the plugged aperture. This means of replacement proves to be at least as unstable and susceptible to spike ratcheting as was the original installation, and thus spike replacement efforts may reoccur several times over the useful life of the tie.

Wood railroad cross ties are treated (typically with creosote) when manufactured to prevent erosion and wood rot. A properly treated tie has a useful life of approximately 25 years depending upon geographical location of tie installation. However, once a spike is driven into a tie, the area that is displaced by the spike becomes exposed to the elements, particularly as the lateral forces described above enlarge the area of displacement. This untreated exposed area around the spike thus captures moisture and microorganisms and is susceptible to freeze and thaw cycles which over time lead to degradation of wood fiber and internal rot around the spike, further weakening the hold between the tie and spike. Industry standard spike replacement methods do little or nothing to address this loss of tie integrity.

This degradation of the tie at and around the site of spike setting in the cross tie also shortens the useful life of the tie leading to premature replacement. Weakened rail ties are hazardous and therefore must be constantly inspected for and attended to. Spike and rail cross tie maintenance and replacement are, therefore, expensive and ongoing undertakings.

Various mechanical means of improving rail spike retention have heretofore been suggested and or utilized (see U.S. Pat. Nos. 2,777,641, 3,865,307, 3,519,205, 3,964,679, 4,203,193, and 5,758,821). Aside from the added expense of such mechanical solutions, many have done little to address the issue of tie degradation around a spike, and have thus met with limited success.

A number of compounds have been heretofore known and/or utilized for improving the strength of an anchor/situs interface (see U.S. Pat. Nos. 4,706,806, 4,723,389, 4,907,917 and 5,397,202). Many of these, however, are not readily adaptable to wood rail cross ties, involve two stage applications and/or require the external application of heat for mixing the compound and thus special tools on site. Moreover, some such compounds by their nature are harmful to the environment and are thus not used for such wide spread applications as is necessary for railway roadbed maintenance. Some such compounds have also not achieved the longevity of securement of the anchor that is desired and/or have done little to address degradation in and around a spike when set in a wood tie.

In particular, it has been heretofore suggested that a mixture of asphalt and sand be used to improve spike-set life. This combination alone has not proved to be an adequate solution for the problem of improving spike retention and has not found acceptance. Further improvement in this vein could, however, be justified, since affordability and ease of application in the field are potentially achieved by such an approach.

SUMMARY OF THE INVENTION

This invention provides a mixture and method for improving rail spike retention and wood cross tie useful life. The mixture and method are particularly well adapted for use when replacing rail spikes, the mixture being simple to apply at remote locations employing a single stage dry mixture application requiring no special tools, heat generated by driving of the spike effecting amalgamation of mixture components and dispersion in the spike aperture.

The dry mixture includes ground aromatic hydrocarbon material, silica sand, and a hydrocarbon resin adhesive/sealant material. More particularly, the mixture consists essentially of (by weight) between about 50% to 70% sub-angular silica sand having a grade between about 35 mesh and 100 mesh (preferably about 60%), between about 25% to 45% ground petroleum pitch (preferably about 35%), and between about 1% to 10% coumarone-indene resin on silicon dioxide (preferably about 5%).

The method of this invention includes the steps of depositing the dry mixture into a formed aperture in the tie for receiving the spike and thereafter driving the spike into the aperture so that heat generated by driving the spike effects amalgamation of the mixture and dispersion of the mixture in the aperture. In this fashion the mixture fills and seals wood fibers adjacent to the aperture at the interior of the tie and adhesively and frictionally aids spike retention in the aperture.

The mixture and method may be used for both new installations (by preforming the spike receiving aperture in the tie) and spike replacement in old installations (utilizing the existing aperture formed when the now dislodged spike was driven into the tie).

It is therefore an object of this invention to provide a rail spike retention and tie preserving mixture and method.

It is another object of this invention to provide a rail spike retention and tie preserving mixture and method that are simple to apply at remote locations, requiring no special tools.

It is still another object of this invention to provide a rail spike retention and tie preserving mixture and method that are useful for both new installations (by preforming a spike receiving aperture in the tie) and spike replacement in old installations (utilizing the existing aperture formed when the now dislodged spike was driven into the tie).

It is another object of this invention to provide a rail spike retention and tie preserving mixture and method that employ a single stage dry mixture application, heat generated by driving of the spike effecting amalgamation of mixture components and dispersion in the spike aperture.

It is still another object of this invention to provide a rail spike retention and tie preserving mixture and method wherein heat generated by driving the spike into an aperture in the tie effects amalgamation of the mixture deposited therein and dispersion of the mixture in the aperture thereby filling and sealing wood fibers adjacent to the aperture at the interior of the tie and adhesively and frictionally aiding spike retention in the aperture.

It is yet another object of this invention to provide a dry mixture for application in an aperture in a wood cross tie to improve spike retention and tie preservation thereat, the dry mixture including ground aromatic hydrocarbon material, silica sand, and a hydrocarbon resin adhesive/sealant material.

It is still another object of this invention to provide a dry mixture for improving spike retention and tie preservation consisting essentially of (by weight) between about 50% to 70% sub-angular silica sand having a grade between about 35 mesh and 100 mesh, between about 25% to 45% ground petroleum pitch, and between about 1% to 10% coumarone-indene resin on silicon dioxide.

It is still another object of this invention to provide a dry mixture for improving spike retention and tie preservation including (by weight) about 60% sub-angular silica sand, about 35% ground petroleum pitch, about 5% coumarone-indene resin on silicon dioxide.

It is yet another object of this invention to provide a method for improving rail spike retention in a wood cross tie while protecting the tie from degradation due to environmental exposure of the interior of the tie around the driven spike, the method including the steps of depositing a dry mixture of ground aromatic hydrocarbon material, silica sand, and a hydrocarbon resin adhesive/sealant material into a formed aperture in the tie for receiving the spike, thereafter driving the spike into the aperture, and heat generated by driving of the spike into the aperture in the tie effecting amalgamation of the mixture and dispersion of the mixture in the aperture thereby filling and sealing wood fibers adjacent the aperture at the interior of the tie and adhesively and frictionally aiding spike retention in the aperture.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying FIGURES illustrate a complete embodiment of the invention according to the best mode so far devised for the practical application of the principles thereof, and in which.

DESCRIPTION OF THE INVENTION

Figure 1:
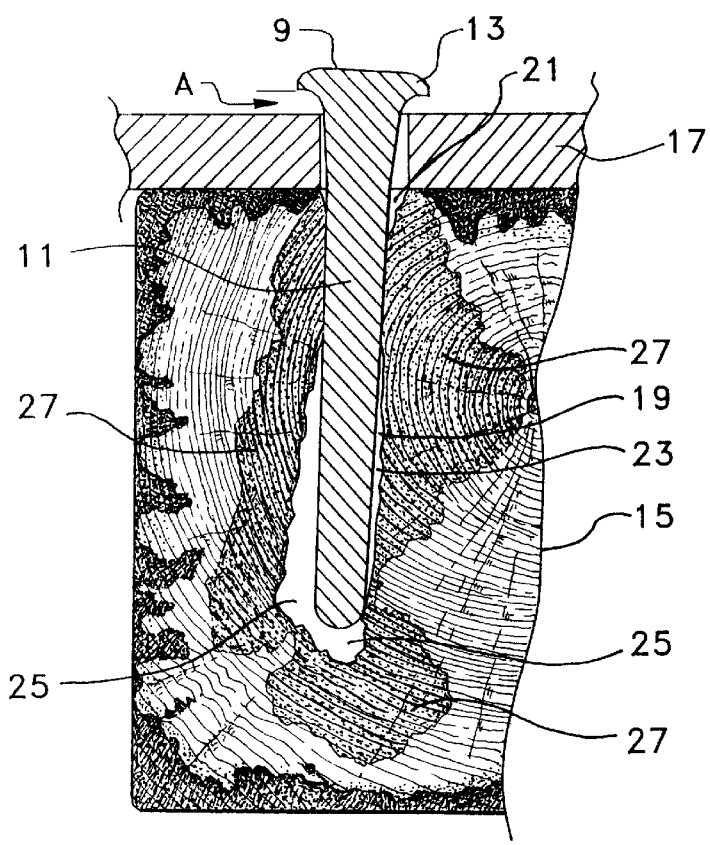
FIG. 1 is a photographically based cross-sectional illustration of a prior art tie/spike installation for retaining a rail.

FIG. 1 illustrates a typical rail installation utilizing spike 9 having a shaft 11 and enlarged head 13. At the time of initial installation, shaft 11 is driven into a wood rail cross tie 15 until head 13 engages flanged base 17 of a typical rail to thus stabilize the rail thereat. Aperture 19 in tie 15 is initially formed when spike 9 is driven into the tie.

Over time, due to spike ratcheting under lateral forces applied by rail traffic, enlargement of aperture 19 occurs (at 21, 23 and 25 for example) as spike 9 ratchets Dut of aperture 19 (FIG. 1, at A). As this process of dislodgement progresses, the lateral forces continue to enlarge aperture 19, particularly toward the bottom of the aperture (at 25). Even before such enlargement occurs moisture seepage around spike 9 can occur, but this process is accelerated by the enlargement of the aperture. Consequently, wood fibers adjacent to aperture 19 absorb moisture (generally the area at 27) accommodated in the enlarged areas and may remain moist for long periods thus promoting microbial growth and resulting degradation of wood fiber (i.e., wood rot). This weakening of wood fiber adjacent to spike 9 leads to further enlargement of aperture 19, thereby promoting spike dislodgement from tie 15 and premature loss of tie integrity.

To alleviate the problem, when installing spike 9 (either in original installation where the aperture in the tie is preformed, for example by drilling, or, more commonly, in subsequent replacement of a spike dislodged as described above) a dry mixture in accord with this invention is deposited into aperture 19. The dry mixture of this invention includes ground aromatic hydrocarbon material (preferably ground petroleum pitch), silica sand (preferably sub-angular (sharp edged) silica sand) and a hydrocarbon resin adhesive/sealant typical of the type used in various rubber, adhesive, paint and coating formations to promote adherence and material preservation. Various other known additives may be included (such as antimicrobials, bactericides, wood preservatives or water repellants and the like) in minor proportions.

The petroleum pitch used in the dry mixture is characterized by a softening point below that generated when spike 9 is driven into aperture 19 (typically spike driving generates heat in the spike substantially exceeding 150° F.). A softening point of between about 150° F. and 250° F. is adequate, though a softening point in the lower ranges risks repeated softening of the pitch while in use, a result which is not preferred. The petroleum pitch is further characterized by a density of about 1.230 g/cc at 51.4° F., a coking value of about 52, a flash (COC° C.) of about 312, and low sulfur content. A flake-type petroleum pitch, for example PULVERIZED PETROPITCH 250 produced by Crowley Chemical Company, Inc., is preferred. The petroleum pitch, when softened, promotes amalgamation of the mixture, dispersal throughout the aperture filling wood fibers adjacent thereto, and adherence.

The sub-angular silica sand of the mixture is preferably washed and dried high silicon dioxide content sand, having a mesh grade rating of S-35 to S-100 (S-70 mesh is preferred) characterized by sharp edges that markedly promote frictional retention of spike 9 in tie 15 found lacking heretofore.

The hydrocarbon resin adhesive/sealant material of this mixture is preferably a coumarone-indene resin on silicon dioxide in powder form such as that produced by Natrochem, Inc. (CI-10 DLC -A or CI-25 DLC -A), though a variety of equivalent compounds could be utilized (for example, hydrocarbon based powder materials with adhesive properties such as rosin esters, polyvinyls, butyrals, or combinations thereof). The adhesive/sealant qualities of this material provide significantly enhanced adhesion and waterproofing not found in the prior art.

The proportions of the above-identified components utilized in the mixture of this invention are (by weight) between about 50% to 70% sub-angular silica sand (preferably about 60%), between about 25% to 45% ground petroleum pitch (preferably about 35%), and between about 1% to 10% coumarone-indene resin on silicon dioxide (preferably about 5%). In dry state formulation, initially care is taken to assure relatively even distribution of the components throughout the mixture, dispersal being thereafter maintained in storage without further mixing (i.e., little or no settling of the components in transport and storage has been experienced). The mixture requires no special handling and has a long shelf life.

In the field, the dry mixture is deposited into the vacant aperture 19, filling the aperture at least half full and preferably filling the aperture to the top of tie 15. Spike 9 is then driven into aperture 19. Heat generated by driving the spike softens the ground aromatic hydrocarbon material, effecting amalgamation of the mixture and dispersion thereof throughout the aperture and into the adjacent wood fibers, filling and sealing team (thus protecting tie 15 from degradative forces adjacent to the spike). The improved adhesive content and frictional surfaces provided by the mixture significantly promote better spike retention.

Figure 2:
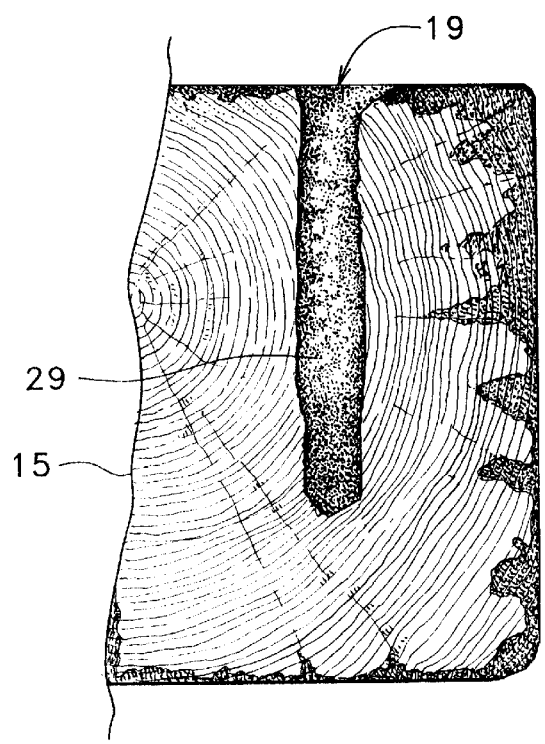
FIG. 2 is an illustration based on a photograph taken of a cross-section of a wood cross tie (spike removed) having utilized the mixture and method of this invention.

When cooled, the amalgamated mixture sets as a somewhat tacky, unitary structure. As seen in FIG. 2, where a spike set in the mixture in aperture 19 of tie 15 has been removed, aperture 19 remains substantially sealed by the remnants of the amalgamated mixture (generally at 29) clinging to the wood fibers even after spike removal. This is indicative of the adhesive and sealing capabilities of the mixture of this invention, tie 15 remaining protected thereby from environmental degradation even in those cases where dislodgement may occur. The particular test tie shown in FIG. 2, while the spike remained therein, was exposed to extensive surface moisture which, in tests on untreated installations, resulted in significant interior dampening of wood fiber adjacent to the aperture due to seepage around the spike and absorption into the tie thereat. As can be seen from the FIGURE, no discoloration due to moisture seepage and absorption is indicated. Further testing has shown that, under a variety of circumstances and conditions, the mixture of this invention provides a significantly better hold between the spike and the tie than heretofore known dry mixtures and industry standard methods, making spike dislodgement less likely and thereby decreasing spike replacement frequency.

What is claimed is:

1. A dry mixture for application in an aperture in a wood cross tie where a rail spike is to be driven to improve spike retention and tie preservation thereat, said dry mixture comprising:
   ground petroleum pitch;
   silica sand; and
   a powdered adhesive/sealant material;
   wherein heat generated by driving of the spike into the aperture in the tie effects amalgamation of said mixture and dispersion of said mixture in the aperture.

2. The dry mixture of claim 1 wherein said silica sand is between about 50% to 70% by weight of said mixture, wherein said ground petroleum is between about 25% to 45% by weight or said mixture, and wherein said powdered adhesive/sealant material is between about 1% to 10% by weight of said mixture.

3. The dry mixture of claim 1 wherein said silica sand is about 60% by weight of said mixture, wherein said ground petroleum pitch is about 35% by weight or said mixture, and wherein said powdered adhesive/sealant material is about 5% by weight of said mixture.

4. The dry mixture of claim 1 wherein said powdered adhesive/sealant material includes a powdered hydrocarbon.

5. The dry mixture of claim 1 wherein said ground petroleum pitch is characterized by a softening point between about 150° F. and 250° F. and density of about 1.230 g/cc at 51.4° F.

6. The dry mixture of claim 1 wherein said silica sand is between grade 35 mesh and 100 mesh sub-angular silica sand.

7. The dry mixture of claim 1 wherein said silica sand is about grade 70 mesh sub-angular silica sand.

8. The dry mixture of claim 1 wherein said powdered adhesive/sealant material is coumarone-indene resin on silicon dioxide.

9. A dry mixture for application in an aperture in a wood cross tie where a rail spike is to be driven to improve spike retention and tie preservation thereat, said dry mixture consisting essentially of by weight:
   between about 50% to 70% sub-angular silica sand having a grade between about 35 mesh and 100 mesh;
   between about 25% to 45% ground petroleum pitch; and
   between about 1% to 10% coumarone-indene resin on silicon dioxide.

10. The dry mixture of claim 9 wherein, by weight, said sub-angular silica sand is about 60% of said mixture, said ground petroleum pitch is about 35% of said mixture, and said coumarone-indene resin on silicon dioxide is about 5% of said mixture.

11. The dry mixture of claim 9 wherein said coumarone-indene resin on silicon dioxide is a powder material, wherein said sub-angular silica sand is preferably at least grade 70 mesh, and wherein said ground petroleum pitch is characterized by a softening point between about 150° F. and 250° F. and density of about 1.230 g/cc at 51.4° F.

12. A method for improving rail spike retention in a wood cross tie while protecting the tie from degradation due to environmental exposure of the interior of the tie around the driven spike, said method comprising the steps of:
   depositing a dry mixture of ground petroleum pitch, silica sand, and a powdered adhesive/sealant material into a formed aperture in the tie for receiving the spike;
   thereafter driving the spike into the aperture; and
   heat generated by driving of the spike into the aperture in the tie effecting amalgamation of the mixture and dispersion of the mixture in the aperture thereby filling and sealing wood fibers adjacent to the aperture at the interior of the tie and adhesively and frictionally aiding spike retention in the aperture.

13. The method of claim 12 further comprising the step of forming said dry mixture of between about 50% to 70% by weight silica sand, between about 25% to 45% by weight ground petroleum pitch, and between about 1% to 10% by weight powdered adhesive/sealant material.

14. The method of claim 12 wherein said silica sand is sub-angular silica sand having a grade between about 35 mesh and 100 mesh and wherein said powdered adhesive/sealant material is coumarone-indene resin on silicon dioxide.

15. The method of claim 12 wherein heat generated by driving the spike is at least about 150° F. and wherein said ground petroleum pitch has a softening point of between about 150° F. and 250° F.

16. The method of claim 12 wherein the step depositing said dry mixture in said formed aperture includes filling said aperture at least half full.

17. The method of claim 12 wherein the spike and the tie are new installations, said method including the step of forming said aperture.

18. The method of claim 12 wherein the spike is a replacement spike and wherein said aperture has been formed by a previously driven and subsequently dislodged spike.

* * * * *